United States Patent
Paulakonis et al.

(10) Patent No.: US 9,106,103 B2
(45) Date of Patent: Aug. 11, 2015

(54) UNINTTERUPTIBLE POWER SUPPLY SYSTEMS AND METHODS EMPLOYING ON-DEMAND ENERGY STORAGE

(75) Inventors: Joseph Charles Paulakonis, Chapel Hill, NC (US); Pradeep Kumar Nandam, Cary, NC (US)

(73) Assignee: Eaton Corporation, Cleveland, OH (US)

( * ) Notice: Subject to any disclaimer, the term of this patent is extended or adjusted under 35 U.S.C. 154(b) by 965 days.

(21) Appl. No.: 13/243,207

(22) Filed: Sep. 23, 2011

(65) Prior Publication Data

US 2013/0076141 A1    Mar. 28, 2013

(51) Int. Cl.
*H02J 7/00* (2006.01)
*H02J 7/34* (2006.01)
*H02J 9/06* (2006.01)

(52) U.S. Cl.
CPC ............. *H02J 7/345* (2013.01); *H02J 9/062* (2013.01); *H02J 2009/063* (2013.01)

(58) Field of Classification Search
CPC ...... H02J 7/345; H02J 9/062; H02J 2009/063
USPC ........................................................ 307/66
See application file for complete search history.

(56) References Cited

U.S. PATENT DOCUMENTS

| | | | | |
|---|---|---|---|---|
| 4,916,329 A | * | 4/1990 | Dang et al. | 307/66 |
| 6,104,104 A | * | 8/2000 | Kuroki | 307/66 |
| 6,160,722 A | | 12/2000 | Thommes et al. | |
| 6,218,744 B1 | * | 4/2001 | Zahrte et al. | 307/64 |
| 6,314,007 B2 | | 11/2001 | Johnson, Jr. et al. | |
| 6,381,156 B1 | * | 4/2002 | Sakai et al. | 363/65 |
| 6,479,970 B2 | * | 11/2002 | Reddy | 320/162 |
| 6,483,730 B2 | * | 11/2002 | Johnson, Jr. | 363/123 |
| 6,819,576 B2 | | 11/2004 | Johnson, Jr. | |
| 7,446,433 B2 | * | 11/2008 | Masciarelli et al. | 307/66 |
| 7,495,415 B2 | * | 2/2009 | Kanouda et al. | 320/112 |
| 2007/0177407 A1 | | 8/2007 | Bruckmann et al. | |
| 2008/0012426 A1 | | 1/2008 | Lu et al. | |
| 2008/0309301 A1 | * | 12/2008 | Shimada et al. | 323/282 |
| 2009/0184583 A1 | * | 7/2009 | Lu et al. | 307/66 |
| 2010/0308658 A1 | * | 12/2010 | Lu et al. | 307/64 |
| 2012/0038337 A1 | * | 2/2012 | Buiatti et al. | 323/282 |
| 2013/0026835 A1 | * | 1/2013 | Ghosh et al. | 307/66 |

FOREIGN PATENT DOCUMENTS

WO    WO 2007/003544 A2    1/2007

OTHER PUBLICATIONS

International Search Report and Written Opinion Corresponding to International Application No. PCT/US2012/056239; Date of Mailing: Jul. 15, 2013; 8 Pages.

* cited by examiner

*Primary Examiner* — Jared Fureman
*Assistant Examiner* — Alfonso Perez Borroto
(74) *Attorney, Agent, or Firm* — Myers Bigel Sibley & Sajovec, P.A.

(57) ABSTRACT

An uninterruptible power supply (UPS) system includes first and second busses, a first switching circuit configured to selectively couple an AC source to the first and second busses and a second switching circuit configured to selectively couple the first and second busses to a load. The system also includes a storage capacitor and a third switching circuit configured to couple the storage capacitor between the first and second busses. The system further includes a control circuit configured to control the first, second and third switching circuits to generate an AC voltage at the load.

16 Claims, 3 Drawing Sheets

UNINTTERUPTIBLE POWER SUPPLY SYSTEMS AND METHODS EMPLOYING ON-DEMAND ENERGY STORAGE

BACKGROUND

The inventive subject matter relates to power conversion circuits and methods and, more particularly, to uninterruptible power supply (UPS) systems and methods.

UPS systems are commonly used in installations such as data centers, medical centers and industrial facilities. UPS systems may be used in such installations to provide backup power to maintain operation in event of failure of the primary utility supply. UPS systems may employ various topologies, including "standby", "line interactive" and "on-line" configurations. In each of these, a battery or other auxiliary power source is used to provide backup power in the event of the degradation or failure of a primary power source, such as an AC utility line.

U.S. Pat. Nos. 6,160,722, 6,314,007 and 6,483,730, commonly assigned to the assignee of the present application, describe UPS systems that include a boost rectifier configured to be coupled to an AC source (e.g., a utility source) and a buck output inverter circuit configured to be coupled to the load and coupled to the output of the rectifier circuit by first and second DC busses. When the AC source meets certain criteria, the rectifier and inverter circuits may be operated to provide what may be described as a line-interactive (or line-adaptive) mode of operation, wherein the boost rectifier and/or the buck inverter may be used to provide amplitude control of the output AC waveform. When the AC source fails, an auxiliary power source (e.g., a battery) may be used to provide power to continue generation of an AC waveform at the load. This arrangement can allow for the use of relatively small capacitors coupled to the first and second DC busses, in contrast to the relatively large storage DC bus storage capacitors often used in "on-line" UPS systems.

The number of bus capacitors can be further reduced by using a switching circuit that alternatively couples the first and second DC busses to a neutral bus, such that a single capacitor may be used to support generation of positive and negative half-cycles of the output AC waveform. FIG. 1 illustrates a UPS system 100 with such an arrangement. The system 100 includes a boost rectifier circuit 110, a buck converter circuit 120, an inverter circuit 130 and a capacitor C1 coupled to first and second busses 105a, 105b. The boost rectifier circuit 110 includes a half bridge circuit including transistors Q1, Q2 that are configured to couple an input inductor L1 to respective ones of the first and second busses 105a, 105b. The buck converter circuit includes a half-bridge circuit including transistors Q3, Q4 that are configured to couple respective ones of the first and second busses 105a, 105b to an output inductor L2. The inverter circuit 130 includes a half-bridge circuit including transistors Q5, Q6 that are configured to alternately couple respective ones of the first and second busses 105a, 105b to a neutral N. A first relay circuit 150 is configured to selectively couple an AC source 10 or a battery 20 to the input inductor L1, and a second relay circuit 160 is configured to selectively couple the output inductor L2 or the AC source to a load 30, such that the power conversion chain may be bypassed by directly connecting the AC source 10 to the load 30. The transistors Q1, Q2, Q3, Q4, Q5, Q6 and the relay circuits 150, 160 are controlled by a control circuit 170 (e.g., a microprocessor or microcontroller and associated circuitry).

Under normal operating conditions when the AC source 10 is providing an acceptable voltage input, the AC source 10 is coupled to the input inductor L1 and the system 100 is operated in a line-interactive manner. When the AC source is within output regulation limits, it is passed directly to the output without boosting or bucking. When the AC input voltage becomes lower or higher then output regulation limits it high frequency boosts or bucks the AC input using the boost rectifier circuit 110 or the buck converter circuit 120. The inverter circuit 130 alternately connects the first and second busses 105a, 105b to the neutral N in successive half-cycles of the AC output to discharge the capacitor C1. In response to a failure of the AC source 10 such as voltage or frequency being out of specification, the battery 20 is connected to the input inductor L1. The boost rectifier circuit 110 may either be used to generate a fixed or time varying DC voltage across the first and second busses 105a, 105b from the battery 20, and the inverter circuit 130 and the buck converter circuit 120 may be used to generate an AC output at the load 30 from this DC voltage.

SUMMARY

Some embodiments of the inventive subject matter provide an uninterruptible power supply (UPS) system including first and second busses, a first switching circuit configured to selectively couple an AC source to the first and second busses and a second switching circuit configured to selectively couple the first and second busses to a load. The system also includes a storage capacitor and a third switching circuit configured to couple the storage capacitor between the first and second busses. The system further includes a control circuit configured to control the first, second and third switching circuits to generate an AC voltage at the load.

The system may further include a fourth switching circuit configured to couple an auxiliary power source to the first and second busses. The control circuit may be configured to cause the fourth switching circuit to couple the auxiliary power source to the first and second busses responsive to a failure of the AC source and the third switching circuit to couple the storage capacitor between the first and second busses to maintain the AC voltage at the load while transitioning to supplying power to the load from the auxiliary power source. The fourth switching circuit may include a mechanical relay configured to selectively couple the auxiliary power source to at least one of the first and second busses and the third switching circuit may include at least one semiconductor switch configured to couple the storage capacitor to at least one of the first and second busses. The control circuit may be configured to cause the third switching circuit to decouple the storage capacitor from at least one of the first and second busses after transitioning to supplying power to the load from the auxiliary power source.

In some embodiments, the storage capacitor includes a first capacitor and the system may further include a second capacitor coupled between the first and second busses and having a capacitance substantially less than a capacitance of the storage capacitor. The control circuit may be configured to cause the second switching circuit to alternately connect the first and second busses to a neutral node for successive half cycles of an AC waveform of the AC source. The second switching circuit may include an inverter circuit configured to selectively couple the first and second busses to the neutral node and a buck converter circuit configured to selectively couple the first and second busses to the load.

In some embodiments, the control circuit may be configured to operate the third switching circuit responsive to a state of the AC source. For example, the control circuit may be configured to cause the third switching circuit to couple the storage capacitor between the first and second busses in response to a failure of the AC source and/or in response to a voltage transient condition of the AC source.

The control circuit may be configured to cause the third switching circuit to momentarily couple the storage capacitor between the first and second busses to precharge the storage capacitor from the AC source.

Additional embodiments provide a UPS system including a boost rectifier circuit having an input port configured to be coupled to an AC source, first and second busses coupled to an output port of the boost rectifier circuit, a first capacitor having a first terminal coupled to the first bus and a second terminal coupled to the second bus, a buck converter circuit having an input port coupled to the first and second busses and an output port configured to be coupled to a load and an inverter circuit configured to selectively couple the first and second busses to a neutral to generate an AC output at the output of the buck converter circuit. The system further includes a second capacitor having a substantially greater capacitance than the first capacitor and a switching circuit configured to couple and decouple the second capacitor to and from at least one of the first and second busses responsive to a state of the AC source.

The system may further include a second switching circuit configured to couple an auxiliary power source to at least one of the first and second busses responsive to a failure of the AC source and the first switching circuit may be configured to couple the second capacitor between the first and second busses to maintain the AC voltage at the load while transitioning to supplying power to the load from the auxiliary power source. The first switching circuit may be configured to couple the second capacitor between the first and second busses substantially more quickly than the first switching circuit couples the auxiliary power source to the at least one of the first and second busses. For example, the second switching circuit may include a mechanical relay configured to couple the auxiliary power source to at least one of the first and second busses and the first switching circuit may include a semiconductor switch configured to couple the second capacitor to at least one of the first and second busses. The system may further include a current limiting circuit configured to be coupled in series with the second capacitor.

Some embodiments provide methods of operating a UPS system including a first switching circuit configured to selectively couple an AC source to first and second busses and a second switching circuit configured to selectively couple the first and second busses to a load. A state of the AC source is detected and, responsive to the detected state, a storage capacitor is coupled between the first and second busses.

DETAILED DESCRIPTION OF EXEMPLARY EMBODIMENTS

Figure 1:
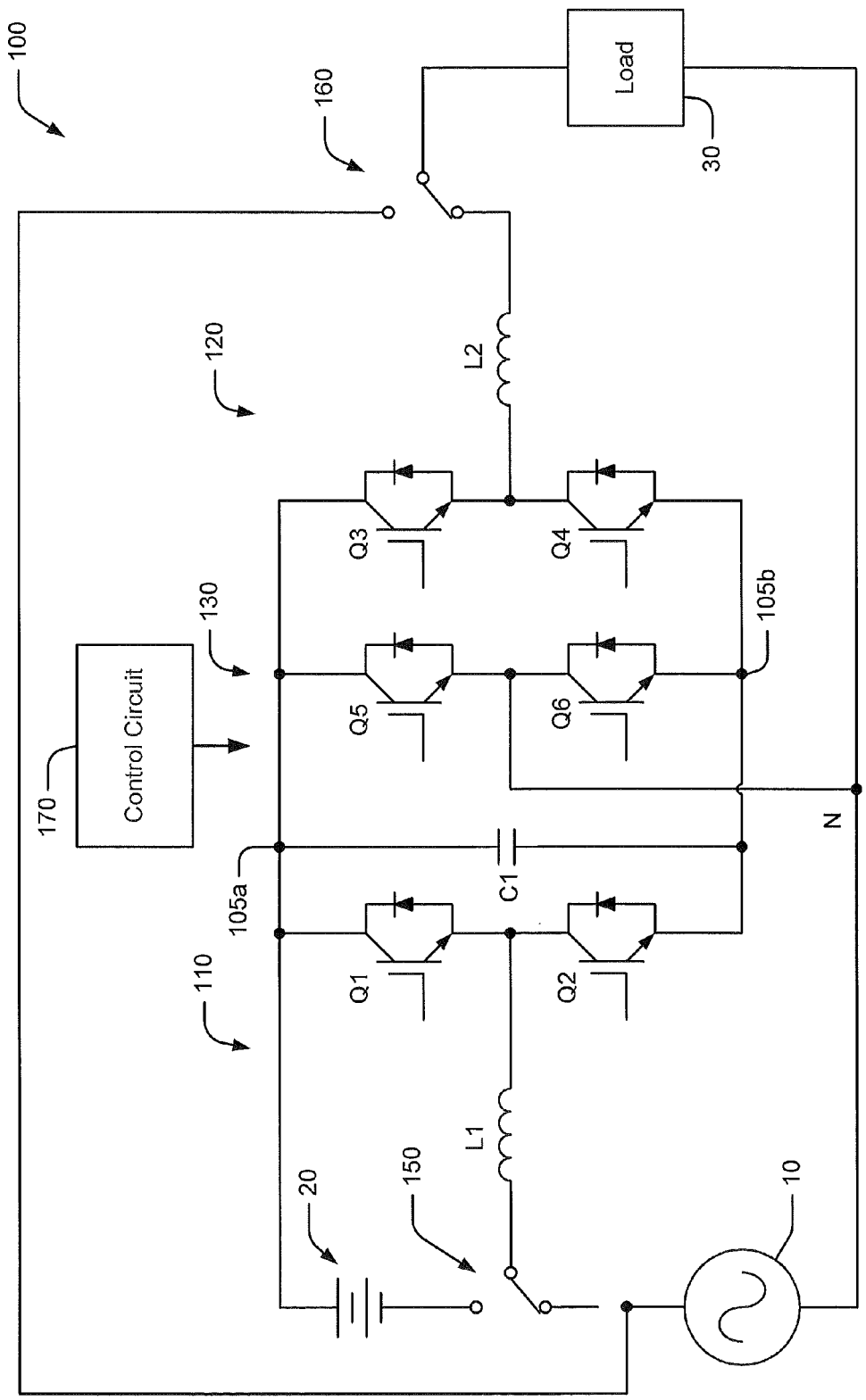
FIG. 1 is a schematic diagram illustrating a conventional uninterruptible power supply (UPS) system.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that some benefits associated with an on-line UPS configurations may be achieved in a line interactive or line adaptive arrangement by providing a selectively available storage capacitance that may be used, for example, to bridge transitions to a backup power source (e.g., a battery) and/or to ride through relatively short-lived transient conditions of the AC input. The storage capacitor may be provided when needed and decoupled when not needed to improve efficiency.

Figure 2:
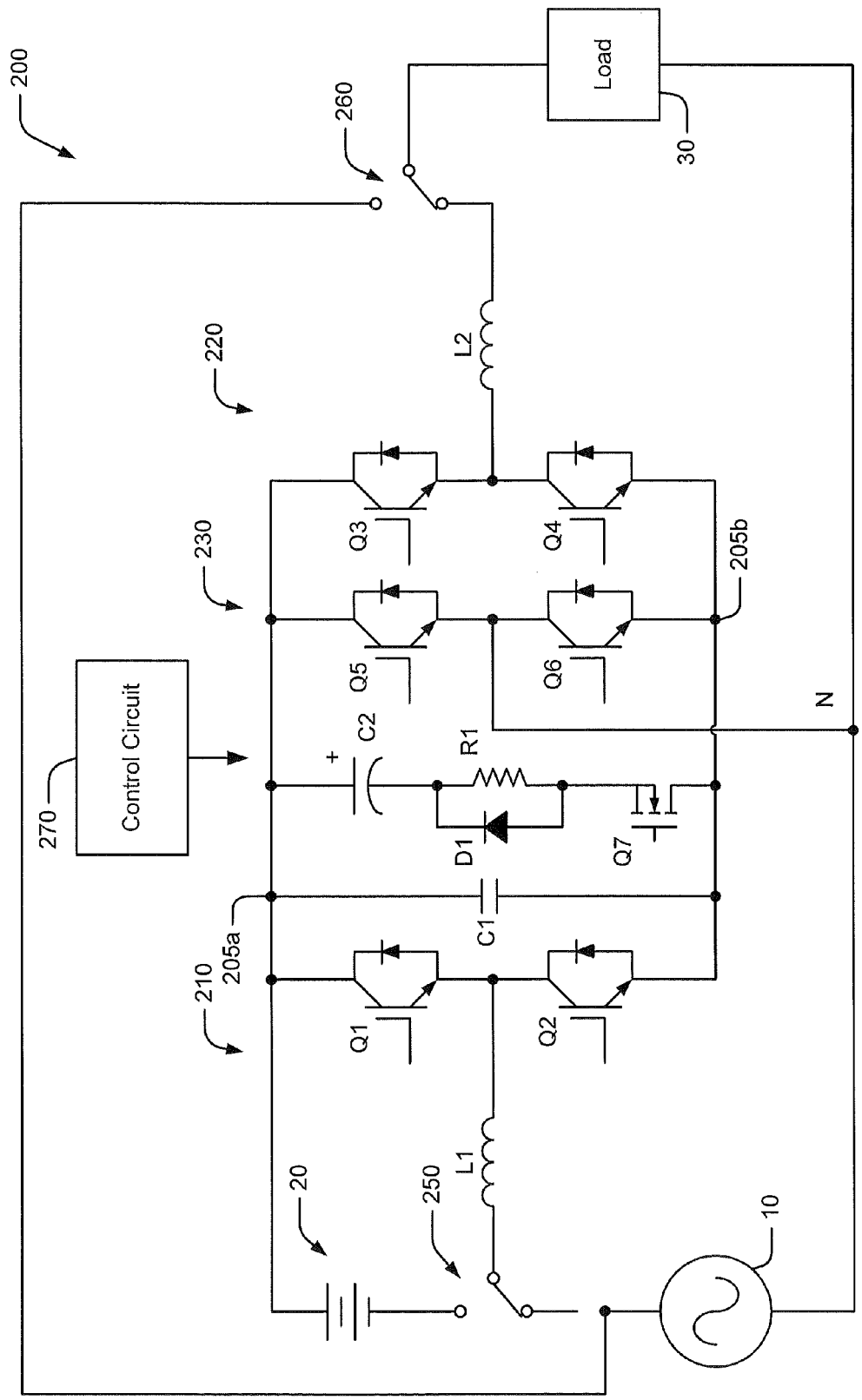
FIG. 2 is a schematic diagram illustrating a UPS system according to some embodiments of the inventive subject matter.

FIG. 2 illustrates a UPS system 200 according to some embodiments of the inventive subject matter. The system 200 includes a boost rectifier circuit 210, a buck converter circuit 220, an inverter circuit 230 and a capacitor C1 alternately coupled to first and second busses 205a, 205b. The boost rectifier circuit 210 includes a half bridge circuit including transistors Q1, Q2 that are configured to couple an input inductor L1 to respective ones of the first and second busses 205a, 205b. The buck converter circuit 220 includes a half-bridge circuit including transistors Q3, Q4 that are configured to couple respective ones of the first and second busses 205a, 205b to an output inductor L2. The inverter circuit 230 includes a half-bridge circuit including transistors Q5, Q6 that are configured to couple respective ones of the first and second busses 205a, 205b to a neutral N. A first relay circuit 250 is configured to selectively couple an AC source 10 or a battery 20 to the input inductor L1, and a second relay circuit 260 is configured to selectively couple the output inductor L2 or the AC source to a load 30, such that the power conversion chain may be bypassed by directly connecting the AC source 10 to the load 30. The transistors Q1, Q2, Q3, Q4, Q5, Q6 and the relay circuits 250, 260 are controlled by a control circuit 270 (e.g., a microprocessor, microcontroller or digital signal processor chip and associated circuitry).

The system 200 further includes a storage capacitor C2 and a switching circuit, here shown as including a transistor Q7, which is configured to couple the storage capacitor C2 between the first and second busses 205a, 205b under control of the control circuit 270. The storage capacitor C2 may have substantially greater capacitance than the capacitor C1 and may be used, as explained below, to provide on-demand energy storage based on a state of the AC source 10. For example, in response to sensing a loss of voltage or other indication of failure of the AC source, the control circuit 270 may couple the storage capacitor C2 between the first and second busses 205a, 205b to provide energy to maintain a desired voltage between the busses and allow the inverter circuit 230 and the buck converter circuit 220 to continue to provide AC power to the load using energy stored in the storage capacitor C2. The storage capacitor C2 may be disconnected once the input relay 250 has transitioned to coupling the battery 20 to the input inductor L1. The control circuit 270 may similar couple the storage capacitor to the busses 205a, 205b to compensate for voltage transients or other conditions of the AC source 10.

Because the storage capacitor C2 may only be intermittently used when needed, its life may be increased in comparison to permanently connected storage capacitors used in online UPS systems, which may have reduced reliability due to heat generated by constant high ripple current. In contrast, because embodiments of the inventive subject matter are used intermittently, the storage capacitors used can be of lower quality and cost than the storage capacitors used in online systems. Because the storage capacitors are used intermittently, the need to provide cooling for the capacitors may be reduced or eliminated.

The storage capacitor C2 may be precharged (i.e., before it is needed for auxiliary energy supply) by momentarily turning on the transistor switch Q7 while the amplitude of the AC source is increasing. As shown, a current limiting circuit, here illustrated as including a resistor R1, may be coupled in series with the storage capacitor C2 to limit inrush currents that might occur when precharging. Diode D1 bypasses R1 when stored energy in the capacitor C2 is released.

Under normal operating conditions, when the AC source 10 is providing an acceptable power input, the AC source 10 is coupled to the input inductor L1 and the system 200 may be operated in a line-interactive manner by boosting, passing, and/or bucking the AC input using the boost rectifier circuit 210 and the buck converter circuit 220. In this mode, the inverter circuit 230 alternately connects the first and second busses 205a, 205b to the neutral N in successive half-cycles of the AC output to discharge the capacitor C1.

In response to a failure of the AC source 10, the switching circuit transistor Q7 turns on, coupling the storage capacitor C2 between the first and second busses 205a, 205b. Concurrently, the input relay circuit 250 may be actuated to change the input connection of the boost rectifier circuit 210 to the battery 20. By using a relatively fast semiconductor switch Q7 to connect the storage capacitor C2, the storage capacitor C2 may relatively quickly provide energy to the inverter circuit 230 and the buck converter circuit 220 during the time it takes for the relatively slow mechanical relay circuit 250 to transition to the battery 20. In this manner, a drop in AC voltage at the load 30 while waiting for the relay operation may be reduced or prevented. After the relay circuit 250 has transitioned to battery connection, the storage capacitor C2 may be disconnected. It may be desirable to allow the storage capacitor C2 to remain connected while on battery power for a period to allow recharging of the storage capacitor C2 from the battery 20. During transition back from the battery 20 to the AC source 10, the storage capacitor C2 may be preboosted (e.g., using the boost rectifier circuit 210) to a voltage that substantially matches the peak voltage of the AC source 10.

According to further embodiments, the storage capacitor C2 may be connected for short intervals to obviate the need to transition to battery power for relatively short outages of the AC source 10. For example, referring to the system of FIG. 2, after detecting a failure of the AC source 10, the control circuit 270 may couple the storage capacitor C2 to the busses 205a, 205b and wait a predetermined interval before actuating the relay circuit 250 to transition to battery power. If the outage lasts only momentarily and the AC source 10 returns to an acceptable condition, the control circuit 270 may simply disconnect the storage capacitor and forego transition to battery power. In this manner, battery 20 life may be increased, and wear and tear on the input relay 250 may be reduced. In further embodiments, a battery or other relatively long-term auxiliary power source may be eliminated. For example, referring to FIG. 2, if the system 200 is used in short outage runtime environments, the battery 20 may be eliminated, and the storage capacitor C2 instead used to provide backup power during short outages and/or voltage transients. In such applications, the storage capacitor C2 may include, for example, a supercapacitor or ultracapacitor that provides greater capacity than a typical electrolytic capacitor. It will further appreciated that combinations of different types of capacitors may also be used in certain embodiments.

The storage capacitor C2 may also be used to prevent transmission of voltage transients from the AC source 10 to the load 30. In particular, the control circuit 270 may sense an overvoltage or other disturbance of the AC source 10 and, in response, may turn on the transistor switch Q7 to couple the storage capacitor C2 between the first and second busses 205a, 205b. This can improve the ability of the system 200 to prevent or reduce transmission of the voltage transient to the load 30.

It will be understood that the circuitry of FIG. 2 is provided for purposes of illustration, and that other circuit configurations embody the inventive subject matter. For example the battery 20 can also be connected with its positive terminal on relay 250 and negative terminal on buss 205b. Another example, rather than providing battery input via the input boost rectifier 210 as shown in FIG. 2, the battery 20 could be coupled to the first bus 205a and/or the second bus 205b via a direct relay or other connection, or via an intermediate converter circuit, such as a DC/DC converter circuit.

Figure 3:
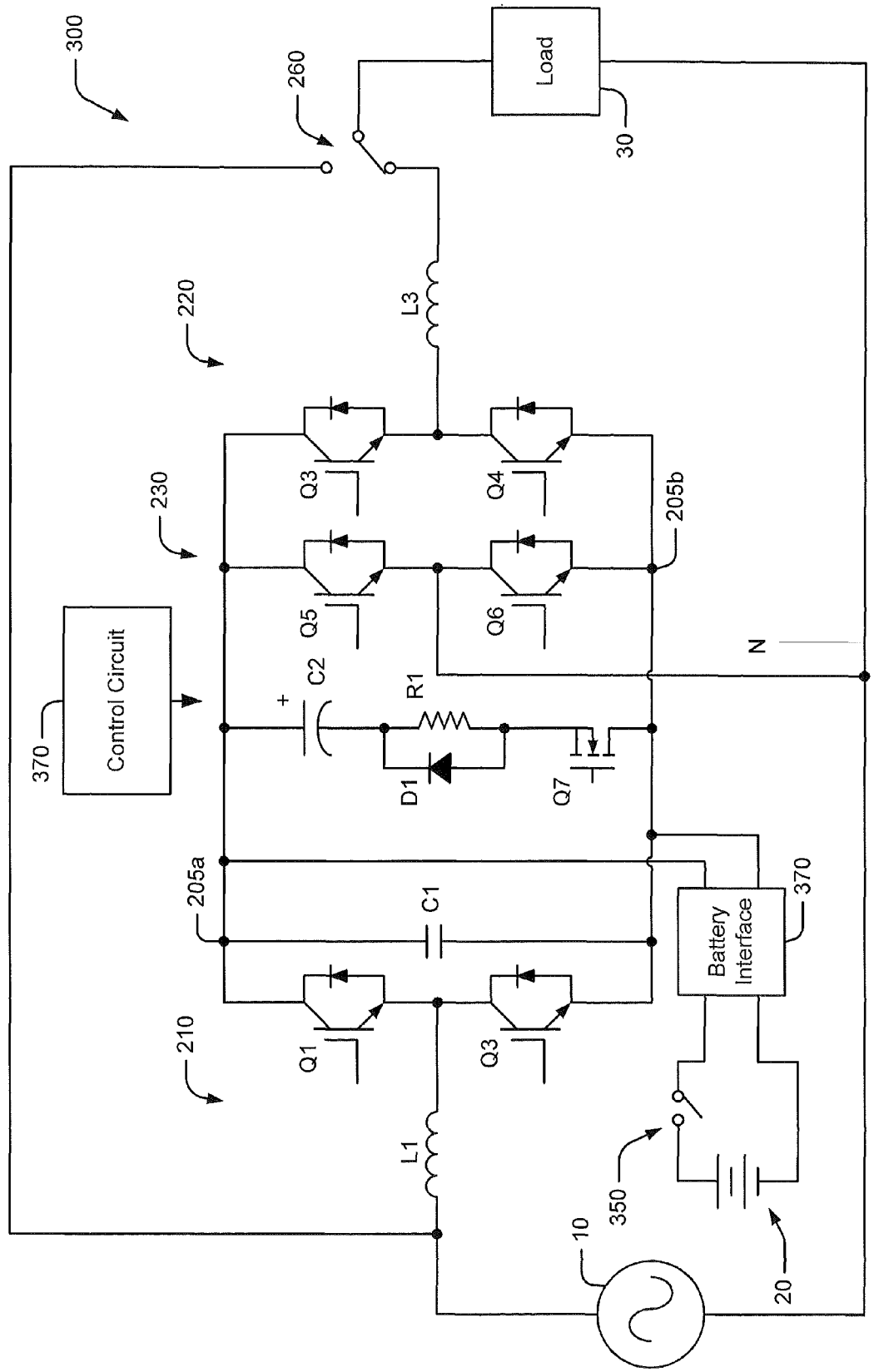
FIG. 3 is a schematic diagram illustrating a UPS system according to further embodiments of the inventive subject matter

A UPS 300 with such an arrangement is illustrated in FIG. 3. The system 300 includes a boost rectifier circuit 210, a buck converter circuit 220, an inverter circuit 230 coupled to busses 205a, 205b, along with a bypass switch 260, along the lines discussed above with reference to the system 200 of FIG. 2. In the system 300, however, a battery 20 is coupled via a switch (e.g., relay) 350 to a battery interface circuit 370 that is coupled to the busses 205a, 205b. A storage capacitor C2 may be selectively coupled to the busses 205a, 205b using a transistor Q7, a current limiting resistor R1 and a bypass diode D1 in a manner similar to that described above with reference to FIG. 2. In particular, the storage capacitor C2 may be used to provide power when transitioning to battery power and/or to provide protection from voltage transients of the AC source 10 or allow frequency conversion.

It will be appreciated that the inventive subject matter is applicable to single and multi-phase UPS systems. For example, in a three-phase application, three converter chains along the lines illustrated in FIGS. 2 and 3 may be used for the respective phases, along with switching circuits for coupling respective storage capacitors thereto along the lines discussed above.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An uninterruptible power supply (UPS) system comprising:
    first and second busses;
    a first switching circuit configured to selectively couple an AC source to the first and second busses;
    a second switching circuit configured to selectively couple the first and second busses to a load;
    a storage capacitor;
    a third switching circuit configured to couple the storage capacitor between the first and second busses;
    a fourth switching circuit configured to couple an auxiliary power source to the first and second busses; and
    a control circuit configured to control the first, second, third, and fourth switching circuits to generate an AC voltage at the load, wherein the control circuit is further configured to cause the third switching circuit to couple the storage capacitor between the first and second busses to maintain the AC voltage at the load while transitioning from supplying power to the load from the AC source to supplying power to the load from the auxiliary power source and to decouple the storage capacitor from at least one of the first and second busses after transitioning to supplying power to the load from the auxiliary power source.

2. The system of claim 1, wherein the fourth switching circuit comprises a mechanical relay configured to selectively couple the auxiliary power source to at least one of the first and second busses and wherein the third switching circuit comprises at least one semiconductor switch configured to couple the storage capacitor to at least one of the first and second busses.

3. The system of claim 1, wherein the storage capacitor comprises a first capacitor and wherein the system further comprises a second capacitor coupled between the first and second busses and having a capacitance substantially less than a capacitance of the storage capacitor.

4. The system of claim 1, wherein the control circuit is configured to cause the second switching circuit to alternately connect the first and second busses to a neutral node for successive half cycles of an AC waveform of the AC source.

5. The system of claim 4, wherein the second switching circuit comprises:
    an inverter circuit configured to selectively couple the first and second busses to the neutral node; and
    a buck converter circuit configured to selectively couple the first and second busses to the load.

6. The system of claim 1, wherein the control circuit is configured to operate the third switching circuit responsive to a state of the AC source.

7. The system of claim 1, wherein the control circuit is configured to cause the third switching circuit to couple the storage capacitor between the first and second busses in response to a failure of the AC source and/or in response to a voltage transient condition of the AC source.

8. The system of claim 1, wherein the control circuit is configured to cause the third switching circuit to momentarily couple the storage capacitor between the first and second busses to charge the storage capacitor from the AC source.

9. A UPS system comprising:
    a boost rectifier circuit having an input port configured to be coupled to an AC source;
    first and second busses coupled to an output port of the boost rectifier circuit;
    a first capacitor having a first terminal coupled to the first bus and a second terminal coupled to the second bus;
    a buck converter circuit having an input port coupled to the first and second busses and an output port configured to be coupled to a load;
    an inverter circuit configured to selectively couple the first and second busses to a neutral to generate an AC output at the output of the buck converter circuit;
    a second capacitor having a substantially greater capacitance than the first capacitor;
    a first switching circuit configured to couple and decouple the second capacitor to and from at least one of the first and second busses responsive to a state of the AC source; and
    a second switching circuit configured to couple an auxiliary power source to at least one of the first and second busses,
    wherein the first switching circuit is configured to couple the second capacitor between the first and second busses to maintain the AC output while transitioning from supplying power to the load from the AC source to supplying power to the load from auxiliary power source and to decouple the second capacitor from at least one of the first and second busses after transitioning to supplying power to the load from the auxiliary power source.

10. The system of claim 9, wherein the first switching circuit is configured to couple the second capacitor between the first and second busses substantially more quickly than the second switching circuit couples the auxiliary power source to the at least one of the first and second busses.

11. The system of claim 9, wherein the second switching circuit comprises a mechanical relay configured to couple the auxiliary power source to at least one of the first and second busses and wherein the first switching circuit comprises a semiconductor switch configured to couple the second capacitor to at least one of the first and second busses.

12. The system of claim 9, further comprising a current limiting circuit configured to be coupled in series with the second capacitor.

13. The system of claim 9, wherein the first switching circuit is configured to momentarily couple the storage capacitor between the first and second busses to charge the storage capacitor from the AC source.

14. A method of operating a UPS system comprising a first switching circuit configured to selectively couple an AC source to first and second busses and a second switching circuit configured to selectively couple the first and second busses to a load, the method comprising:
    detecting a state of the AC source;
    coupling a storage capacitor between the first and second busses responsive to the detected state of the AC source to maintain an AC output to the load;
    coupling a battery to at least one of the first and second busses to provide power to the load from the battery; and then
    decoupling the storage capacitor from at least one of the first and second busses.

15. The method of claim 14, wherein the storage capacitor comprises a first capacitor, wherein the UPS system further comprises a second capacitor coupled between the first and second busses and having substantially less capacitance than the first capacitor and wherein coupling a storage capacitor between the first and second busses responsive to the detected state of the AC source comprises coupling the first capacitor in parallel with the second capacitor.

16. The method of Claim 14, wherein coupling a battery to at least one of the first and second busses comprises actuating a mechanical relay to couple the battery to at least one of the first and second busses and wherein coupling a storage capacitor between the first and second busses responsive to the detected state of the AC source comprises activating a semiconductor switch to couple the storage capacitor to at least one of the first and second busses.

\* \* \* \* \*